Oct. 31, 1961 J. A. KAYSER 3,006,168
SELF-LUBRICATING UNIVERSAL JOINT
Filed Feb. 17, 1960 2 Sheets-Sheet 1

INVENTOR.
JOHN A. KAYSER
BY Walter E. Pawlick
ATTORNEY

Oct. 31, 1961  J. A. KAYSER  3,006,168
SELF-LUBRICATING UNIVERSAL JOINT
Filed Feb. 17, 1960  2 Sheets-Sheet 2

*INVENTOR.*
JOHN A. KAYSER
BY *Walter E. Pavlick*
ATTORNEY

United States Patent Office

3,006,168
Patented Oct. 31, 1961

3,006,168
SELF-LUBRICATING UNIVERSAL JOINT
John A. Kayser, Toledo, Ohio, assignor to Dana Corporation, Toledo, Ohio, a corporation of Virginia
Filed Feb. 17, 1960, Ser. No. 9,388
11 Claims. (Cl. 64—17)

This invention relates to universal joints and more particularly to a self-lubricating universal joint.

Prior universal joint constructions have included a central cross member having diametrically opposed pins extending therefrom. These pins have been received in the bushings of a suitable pair of yoke members. This arrangement requires proper lubrication at all times. Usually the universal joint for a vehicle is arranged in an inaccessible position and for this reason lubrication of the joint is quite frequently neglected with the result that the joints become heated and wear rather quickly.

It has also been found that although the universal joints may be lubricated periodically and properly, nevertheless the lubricant is lost during use of the joint under the action of centrifugal force or for various other causes. For this reason it is not unusual for the universal joint to run dry even if given proper attention, and to be seriously damaged by the resultant wear when the lubricant has been lost.

Heretofore, universal joint constructions have also provided lubricant reservoirs from which lubricant is fed to the bearing surfaces by centrifugal force. In these constructions the speed at which the universal joint rotates determines the amount of oil delivered to the bearings, and so at very high speeds, the bearings become flooded with lubricant owing to the great centrifugal forces set up. Furthermore, the extreme fluid pressure caused by the centrifugal force has often produce failure of the joint sealing means.

An object of this invention is to provide a universal joint having a main and auxiliary reservoir for supplying lubricant to the bearings.

Another object of this invention is to utilize the change in linear speed of a vehicle to replenish an auxiliary lubricant reservoir.

Another object of this invention is to intermittently supply small quantities of lubricant to the auxiliary reservoir so that the centrifugal forces set up by such fluid will not become excessive.

Still another object of this invention is to trap the lubricant in the auxiliary reservoir and prevent its re-entry into the main reservoir.

A further object of this invention is to provide a self-lubricating universal joint which is inexpensive, easy to manufacture, and efficient in operation.

In one preferred embodiment of this invention, one of the yoke members of a universal joint is provided with a main lubricant reservoir. The trunnions of the intermediate cross member are provided with passages which communicate with the joint bearings. An auxiliary reservoir connects the main reservoir with the trunnion passages for supplying lubricant to the bearing surfaces. An orifice restricts entry of lubricant into the auxiliary reservoir from the main reservoir so that when the lubricant in the main reservoir rushes forward (or to the rear depending upon the position of the joint in the vehicle) upon change of speed of the vehicle, only a limited amount of lubricant will be supplied to the auxiliary reservoir. From the auxiliary reservoir the lubricant passes by centrifugal force through the trunnion passages to the bearings.

These and other objects and advantages of this invention will become apparent from the following detailed description when taken in connection with the accompanying drawings wherein.

Figure 1:
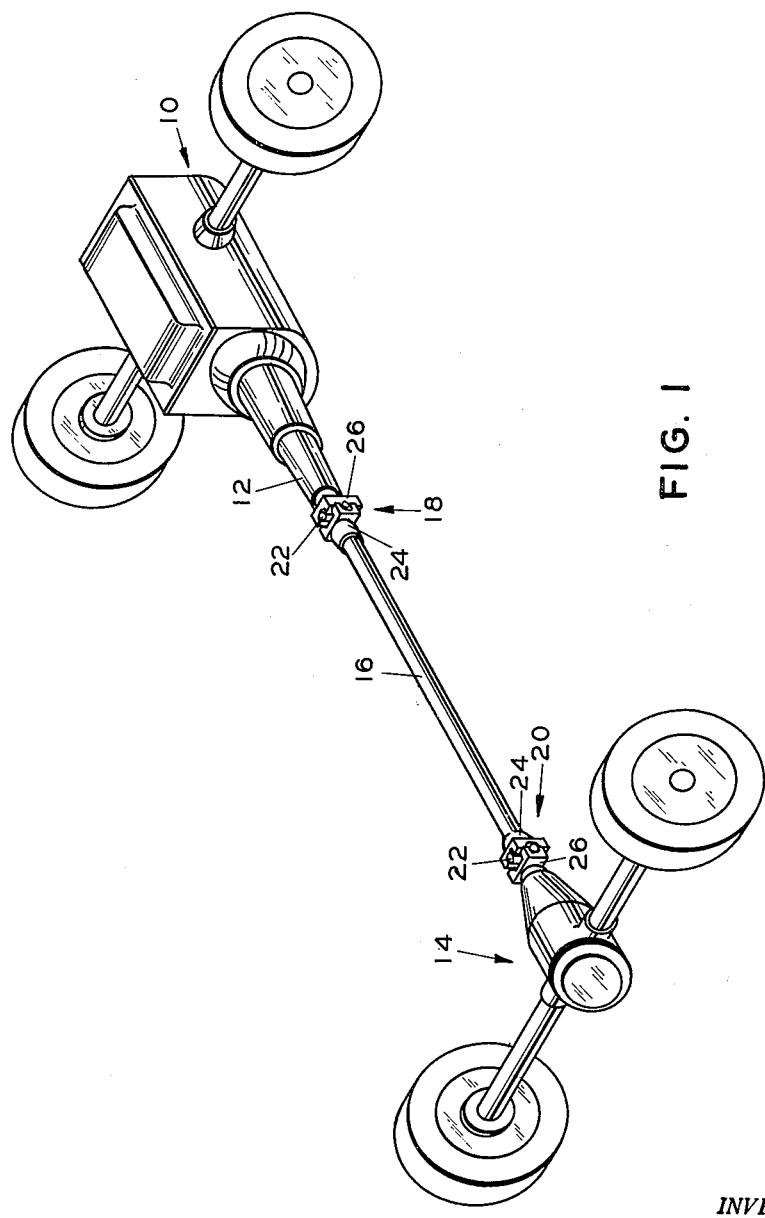
FIG. 1 is a diagrammatic perspective view of a portion of a motor vehicle illustrating the use of the present invention.

Referring more particularly to FIG. 1, a portion of a motor vehicle is ilustrated and comprises a trans-axle 10 having a transmission portion 12 for driving a rear axle 14. The transmission 12 drives the rear axle 14 through a drive shaft 16 which has universal joint connecting means 18 and 20 provided on the front and rear portions thereof respectively.

The universal joints 18 and 20 include a cross 22 and a pair of opposed yokes 24 and 26 connected thereto. The cross 22 is provided with the usual bearing pins or trunnions 28, 30, 32, and 34 arranged at 90° intervals in a common plane at the periphery of the body portion 36 of the cross.

Figure 2:
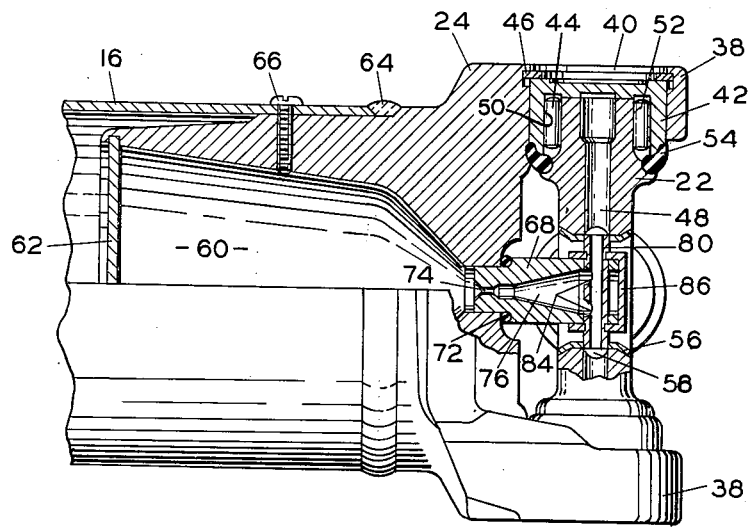
FIG. 2 is a partial sectional view of the universal joint embodying this invention.

Each yoke 24 and 26 is provided with a pair of spaced axial arms 38 having bores 40 disposed centrally therein and adapted to receive the trunnions of the cross member 22. The yokes when attached to the cross are disposed at right angles to each other in overlapping relation and the yokes are sufficiently spaced apart to permit free rotation of the joint although the axis of one yoke may be disposed at an angle to the axis of the other yoke. While, as shown in FIG. 2, the yokes are provided with bores for receiving the trunnions, it is obvious that the cross may be secured to the yoke members by other suitable means such as a U-bolt.

To rotatably mount the trunnions of the cross member 22 in the bores 40, a bearing retainer 42 is press fitted within each bore 40. The bearing retainer 42 is of cup-shape configuration and has the open end extending inwardly towards the axis of the yoke. A plurality of needle bearings 44 are disposed around the inner circumference of the bearing retainer 42 and engage the outer portion of a trunnion which is seated in the bearing retainer. The bores 40 are provided with grooves on the inner circumference thereof which receive a snap ring 46 extending over the bearing retainer 42 to secure the same in place.

Figure 3:
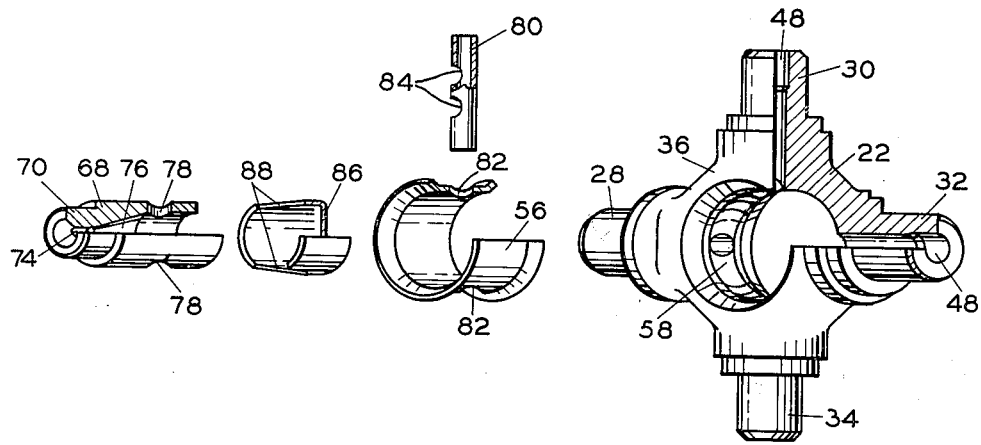
FIG. 3 is an exploded perspective view partly in section illustrating the universal joint shown in FIG. 2.

The main body portion 36 of the cross 22 is hollowed out at the central portion thereof, as clearly seen in FIG. 3. Each pin or trunnion of the cross 22 is longitudinally drilled at 48, the channel or passage thus formed extending from the interior hollow portion of the cross to the end of each pin. These radially extending passages 48 are adapted to transmit lubricant radially outwardly against the bottom of the bearing retainer 42 by centrifugal action upon rotation of the joint. From here, the lubricant seeps between the bearing retainer and the end of the pin to the bearing surfaces 50 and 52 on the bearing retainer 42 and the pins of the cross member 22, respectively, and the needle bearings disposed therebetween. An annular member 54 of sealing material is fitted around the open end of each cup-shaped bearing retainer 42 and engages its respective cross member as clearly shown in FIG. 2 to prevent external leakage of the lubricant and ingress of dirt and grit to the bearing surfaces.

An annular member 56 is tightly secured in the hollowed out central portion of cross 22 and has the ends thereof flared outwardly to conform to the internal contour of the cross. An annular groove 58 is provided around the circumference of the hollowed out portion of the cross 22 and communicates with the radially extending passages 48 of each trunnion or pin. The groove 58 and the annular member 56 define a circular passage in registry with the inner end of the trunnion passages 48 and thus may distribute lubricant from one to the other.

To provide a main lubricant reservoir, one of the yokes (in this instance yoke 24) has a large substantially cone-shaped opening 60 centrally therein with the opening diameter at the outer end of the yoke being large and progressively decreasing as it approaches the inner yoke end. The outer end of the yoke 24 is closed by a circular plate 62 thus forming a main lubricant reservoir 60. This end of the yoke 24 is positioned within the drive shaft 16 and secured thereto by an annular weld 64. An aperture extends through a wall of the drive shaft 16 and the yoke 24 so that access may be gained to the main reservoir 60. The aperture is closed by a screw 66 threadedly received therein. While this lubricant supply aperture has been shown, it is obvious that the same may be eliminated since the initial supply of lubricant is contemplated to be sufficient for the life of the vehicle in which the universal joint is to be installed.

Means is provided for supplying lubricant from the main reservoir 60 to the pin or trunnion passages 48. More specifically, a sleeve 68 is provided with a reduced portion 70 which is received in an aperture formed in the yoke 24 at the inner end of the cone-shaped main reservoir 60. An annular seal 72 is positioned between a shoulder formed by the reduced portion 70 and the external portion of the inner end of yoke 24 to prevent leakage of lubricant from the main reservoir. The sleeve 68 is provided with an orifice 74 at the reduced end portion 70 which orifice enlarges into a cone-shaped opening or auxiliary reservoir 76.

The other end of the sleeve 68 extends within the hollowed out portion of the cross member 22 and is provided with aligned apertures 78 which receive a tube 80. The tube 80 extends diametrically through the sleeve 68 and has its ends journaled in apertures 82 of the annular member 56 which apertures are aligned with the passages 48 of trunnions 30 and 34. The tube 80 is provided with a pair of spaced holes 84 in the medial portion thereof to receive lubricant from the auxiliary reservoir 76 and transmit it radially outwardly to the trunnion passages. A cap 86 is secured over the end of sleeve 68 and has opposed V-shaped relieved portions 88 to the accommodate the ends of the tube 80. The end cap 86 is firmly secured to the sleeve 68 to prevent external leakage of the lubricant. While the sleeve 68, tube 80, and end cap 86 have been shown as separate parts, it is readily apparent that these parts may be constructed as an integral member and still retain the desired operating function.

In operation the universal joints 18 and 20 are supplied with lubricant and installed in a vehicle, one universal joint being provided on either end of the drive shaft thereof. When so installed, the main lubricant reservoir of the universal joint 18 will be to the rear of the cross member 22 and the main lubricant reservoir of the universal joint 20 will be in front of the cross member 22 thereof. Thus, upon acceleration of the vehicle, as when the vehicle starts from rest, lubricant in the main reservoir 60 of the universal joint 20 will rush rearwardly and a small quantity or dose thereof will be supplied to the auxiliary reservoir 76 through orifice 74. The universal joint 20 being drivingly rotated, lubricant within auxiliary reservoir 76 enters the holes 84 of the tube 80 and is thrown radially outwardly in the passages 48 of trunnions 30 and 34. The lubricant then seeps between the bearing retainer 42 and the trunnion to the bearing surfaces 50 and 52 and the needle bearings 44. When the bearing passages 48 of trunnions 30 and 34 become filled with lubricant, the lubricant flows through annular passage 58 to the passages 48 of the trunnions 28 and 32 and consequently outwardly to the bearing surfaces thereof. Each time the vehicle is accelerated lubricant will splash from the main reservoir through the orifice 74 to the bearing surfaces in a similar manner. Upon deceleration or cessation of the rotational movement of the universal joint 20, the orifice 74 will serve to trap a quantity of lubricant within the auxiliary reservoir for further operation.

Upon deceleration of the vehicle, lubricant will rush forwardly from the main lubricant reservoir 60 of universal joint 18 and pass through orifice 74 into the auxiliary reservoir 76 thereof. Lubricant will then be passed by centrifugal action to the bearing surfaces 50 and 52 of each trunnion and yoke of the universal joint 18 in a manner similar to that aforedescribed.

It should be particularly pointed out that while lubricant is supplied from the auxiliary reservoir to the bearing surfaces by centrifugal action due to the rotation of the universal joint, entry of fluid into the auxiliary reservoir from the main reservoir is entirely independent of rotation of the joint and is caused by changes in velocity of the vehicle. It is this change of velocity of the vehicle and the consequent change in axial motion of the universal joint which effects intermittent splashing or entry of small quantities or doses of lubricant from the main reservoir to the auxiliary reservoir.

It is apparent with this arrangement large centrifugal forces are eliminated on the bearing retainer and the lubricant sealing means since only a small mass of fluid is thrown outwardly thereto.

While only a single embodiment of this invention has been shown and described, it is apparent that there may be many changes in structure as well as operation without departing from the scope of this invention as defined by the appended claims.

I claim:

1. In a self-lubricating universal joint for use in a vehicle the combination comprising a first connecting member having a main lubricant reservoir therein, a second connecting member for supplying lubricant to the surfaces to be lubricated, and means forming an auxiliary reservoir interconnecting said main reservoir and said second connecting member, and means for restricting lubricant flow to said auxiliary reservoir, the lubricant being supplied to said auxiliary reservoir from said main reservoir upon change of speed of the vehicle.

2. In a self-lubricating universal joint the combination comprising a connecting member having a main lubricant reservoir, means forming an auxiliary reservoir communicating with said main reservoir and adapted to supply lubricant to the surfaces which are to be lubricated, and means positioned between said reservoirs for restricting the lubricant flow, the lubricant being supplied to said auxiliary reservoir from said main reservoir in response to changes in axial movement of the universal joint.

3. In a self-lubricating universal joint the combination comprising a pair of connecting members having bearing surfaces thereon, one of said connecting members having a main lubricant reservoir, means forming an auxiliary reservoir communicating with said main reservoir and adapted to supply lubricant to said bearing surfaces, and an orifice restricting lubricant flow to said auxiliary reservoir, the lubricant being supplied to said auxiliary reservoir from said main reservoir upon changes in axial movement of the universal joint.

4. In a self-lubricating universal joint for use in a vehicle the combination comprising a connecting member having a main lubricant reservoir, means forming an auxiliary reservoir communicating with and axially spaced relative to the main reservoir, said auxiliary reservoir being adapted to supply lubricant to the surfaces which are to be lubricated, and means restricting lubricant flow to said auxiliary reservoir, the lubricant being supplied to said auxiliary reservoir upon change of speed of the vehicle.

5. A self-lubricating universal joint comprising a pair of connecting members, one of said members having a main lubricant reservoir, means forming an auxiliary reservoir communicating and axially aligned with said main reservoir, said auxiliary reservoir being adapted to supply lubricant to the surfaces which are to be lubricated, and an orifice restricting lubricant flow to said auxiliary reservoir whereby lubricant is intermittently supplied to said auxiliary reservoir in response to changes in axial movement of the universal joint.

6. A self-lubricating universal joint for use in a vehicle comprising a pair of connecting members, one of said members having a main lubricant reservoir, means forming an auxiliary reservoir communicating with said main reservoir and adapted to supply lubricant to the surfaces which are to be lubricated, and means restricting lubricant flow to the auxiliary reservoir, the lubricant being supplied from said main to said auxiliary reservoir upon change of speed of the vehicle and independent of rotation of the universal joint.

7. A self-lubricating universal joint comprising a pair of connecting universal joint members, one of said members having a main lubricant reservoir therein, and the other of said members having means for supplying lubricant to the bearing surfaces upon centrifugal action, means forming an auxiliary reservoir communicating said main reservoir with said lubricant supplying means, and means restricting lubricant flow to said auxiliary reservoir whereby lubricant is intermittently supplied to said auxiliary reservoir in response to changes in axial movement of the universal joint.

8. A universal joint comprising a yoke member having bearing means thereon, and defining a main lubricant reservoir, a cross member having passaged trunnions journaled in said bearing means, means interconnecting said yoke and said cross and defining an auxiliary lubricant reservoir which communicates with said main reservoir and the passages in said cross member, and means restricting the flow of lubricant between said main and auxiliary reservoir whereby lubricant is intermittently supplied to said auxiliary reservoir in response to changes in axial movement of the universal joint.

9. A self-lubricating universal joint comprising a pair of yoke members one being provided with a main lubricant reservoir, a cross member having trunnions journaled in said yokes, said trunnions having passages therein for supplying lubricant radially outwardly of the axis of rotation to the bearing surfaces by centrifugal action upon rotation of the universal joint, means forming an auxiliary reservoir communicating said main reservoir with said trunnion passages, and an orifice restricting lubricant flow between said main and auxiliary reservoir, the lubricant being supplied through said orifice to the auxiliary reservoir in response to changes in axial movement of the universal joint.

10. In a universal joint of the trunnion type, a yoke member having a pair of centrally disposed reservoirs for fluid lubricant, coaxial with the axis of rotation of the joint, an orifice interconnecting the said reservoirs, whereby lubricant is supplied from one reservoir to the other in response to changes in axial movement of the universal joint, a cross member having trunnions journaled in said yoke and provided with a centrally disposed opening, said cross member being concentrically arranged about one of the reservoirs, said trunnions having passages leading from said opening to the bearing surfaces, an annular channel in said opening interconnecting said passage, tube means connecting the one said reservoir to said annular channel, whereby lubricant is supplied from last said reservoir to the bearing surfaces by centrifugal action upon rotation of the universal joint.

11. A universal joint comprising a yoke member having bearing means thereon and defining a main lubricant reservoir, a cross member having passaged trunnions journaled in said bearing means and having a centrally disposed opening, an annular groove interconnecting the passage in said cross member, an auxiliary reservoir in said opening and in communication with said main reservoir, tube means interconnecting said auxiliary reservoir with said annular grove whereby upon rotation of the joint lubricant will be transmitted from the auxiliary reservoir to said annular groove and through the passages to the said bearing means.

References Cited in the file of this patent

UNITED STATES PATENTS

| | | |
|---|---|---|
| 1,483,865 | Bowen | Feb. 19, 1924 |
| 1,889,470 | Garrett | Nov. 29, 1932 |
| 1,949,859 | Charles | Mar. 6, 1934 |